May 31, 1960   E. ALIZON ET AL   2,939,068
ELECTROMAGNETIC DEVICE
Filed June 20, 1955

INVENTORS
ETIENNE ALIZON
AND CLAUDE MONIN
BY Paul M. Craig Jr.
ATTORNEY

United States Patent Office 2,939,068
Patented May 31, 1960

2,939,068

ELECTROMAGNETIC DEVICE

Etienne Alizon, La Celle St. Cloud, and Claude Monin, Paris, France, assignors to Compagnie Industrielle des Telephones, Paris, France, a corporation of France Filed June 20, 1955, Ser. No. 516,574

Claims priority, application France July 20, 1954

6 Claims. (Cl. 321—25)

The invention concerns electromagnetic control and memory devices adapted to be employed more especially in automatic telephony and remote control.

The present invention has for its objective to provide a device which is intended to replace electromagnetical relays where it is necessary to provide a member endowed with a memory and adapted to respond to complex tripping conditions.

The present invention has for its object to provide a similar device which is also intended to replace electromechanical relays for the aforesaid purposes. This device is developed from a magnetic amplifier arrangement of the self-excited type, the well-known features of which are hereinafter described.

A magnetic amplifier having simplified self-excitation generally comprises a magnetic circuit having a rectangular hysteresis loop, on which is provided a control winding through which a direct current, which may be designated $Ic$ is passed, and a shock winding fed by a sinusoidal alternating voltage in series with a dry rectifier and a ballast resistance. There is passed through the latter winding a rectified alternating current corresponding to one half-wave of the alternating voltage, the polarity of which half-wave corresponds to the forward direction of the dry rectifier. The said rectified alternating current therefore comprises a direct component designated $Is$, the variation of which as a function of the current $Ic$ has the well-known general form indicated in Figure 2 of the accompanying drawings hereinafter referred to.

In general, the association of two magnetic amplifiers having simplified self-excitation is employed, the dry rectifiers of which are connected in opposition, so that the alternating currents which have undergone half-wave rectification, supplied by each single amplifier are of equal amplitude and in phase opposition.

The combination of the said currents then provides a substantially sinusoidal alternating current which is rectified by conventional methods, for example by a bridge of dry rectifiers, for feeding a common load.

By reason of the symmetry of the arrangement, it will be seen that the direct components of the output current of each single amplifier, which are constantly of equal magnitude and of opposite direction, completely cancel one another out. This arrangement permits of obtaining a magnetic amplifier which has a good output, and a characteristic curve very similar to that of the simple magnetic amplifiers of which it is composed. For the proposed applications of the devices according to the present invention, it is necessary to obtain varied characteristic curves so as to impart thereto great flexibility of operation.

According to the present invention there is provided an electromagnetic device comprising two magnetic circuits having a rectangular hysteresis loop, on each of which there are provided a control winding and a shock winding fed by an alternating current source and associated with dry rectifiers connected in opposition and each supplying an output current, wherein the device includes means adapted to produce dissymmetry between the two magnetic circuits so as to produce an unbalance between the two rectified currents, the output current resulting from the combination of the direct components of the said rectified currents, while the alternating components are eliminated by filtering.

In accordance with the invention, this dissymmetry is produced by reversing the direction of the control winding on one of the magnetic circuits, or with the aid of polarising windings through which currents of different values are passed or with the aid of a resistance connected in series with either one of the two rectifiers.

Another feature of the invention resides in the use, in combination with the aforesaid means, of feedback windings disposed on each magnetic circuit and having the aforesaid direct components, or the combination thereof, passed therethrough.

For a better understanding of the invention and to show how the same may be carried into effect reference will now be made to the accompanying drawings, which illustrate without constituting any limitation, a constructional form of a device according to the invention with various possible connections.

The windings 1, 2, 3 and 4 are disposed on a magnetic circuit consisting of metal of high permeability and having a rectangular hysteresis loop, and the windings 1', 2', 3' and 4' on another similar circuit.

Figure 1:
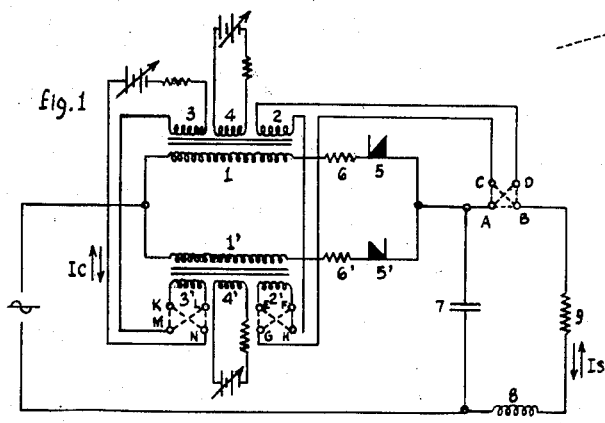
Figure 1 illustrates diagrammatically the circuit arrangement of such a device.

The shock windings 1 and 1' are each connected in series with a rectifier 5 and 5' and a resistance 6, 6' and fed in parallel with an alternating current, the rectifiers being connected in opposition to one another as indicated in Figure 1.

Also disposed on the alternating current circuit is an elementary filter consisting of a capacitor 7 and of a self-inductance 8, and to the output of which there are connected a ballast resistance 9 and terminals AB which may be connected either together or to the terminals CD respectively of the windings 2, 2', called "feedback" windings. The terminals E, F, G, H, K, L, M and N permit connecting the windings 2' and 3' in one direction or the other with respect to the windings 2 and 3.

There is passed through the windings 3, 3' the direct control current, and through the windings 4, 4' so-called "polarising" direct currents.

Figure 2:
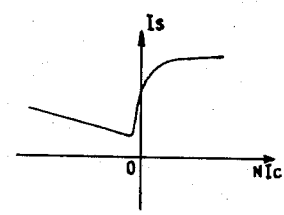
Figure 2 illustrates the known characteristic curve obtained by providing a single magnetic circuit in the arrangement.

When only one magnetic circuit is provided in the circuit, that is to say, when the terminals of the winding 1' are insulated from the remainder of the circuit arrangement, the curve representing the direct output current $Is$ flowing across the resistance 9 as a function of the ampereturns $NIc$ supplied by the windings 3, 3' has the form illustrated in Figure 2. The polarising ampereturns $NIp$ supplied by the winding 4 have the effect of displacing the curve in a direction parallel to the axis of the abscissae.

The direct output current obtained in the circuit arrangement comprising the two magnetic circuits, as in Figure 1, is obtained by algebraically adding the two direct currents corresponding to each of the two magnetic circuits. In fact, since the two rectifiers are connected in opposition to one another, it may be considered that the magnetic circuits take effect alternately, independently of one another.

Figure 3:
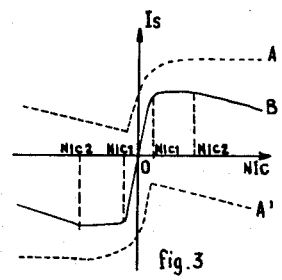
Figures 3 to 7 show how the desired characteristic curves are obtained by disposing two magnetic circuits in the arrangement, by suitably choosing the direction of the control windings on each of them, and the direction and strength of the currents flowing through the polarising windings, and by introducing a feedback of appropriate direction.

Figure 3 shows the characteristic curve obtained by providing at the terminals of the windings 3 and 3' connections of such direction that when the ampere-turns supplied by the windings 1 and 3 are of like direction, the ampere-turns supplied by the windings 1' and 3' are of opposite direction, assuming that no current flows through the windings 4 and 4' and that the value of the resistances 6 and 6' is zero.

The curves A and A' represent the direct output currents corresponding to each of the magnetic circuits, the curve B representing the true characteristic curve of the device in which the strength of the current corresponds to the algebraic sum of those taken from the curves A and A'. The characteristic curve is such that the output current changes rapidly from a negative value to a positive value, which is equal thereto in absolute value, when the control current passes through zero value. When the control current remains between the values $NIC_1$ and $NIC_2$ on the one hand, and $-NIC_1$ and $-NIC_2$ on the other hand, the output current retains substantially the same positive value on the one hand and the same negative value on the other hand.

Figure 4:
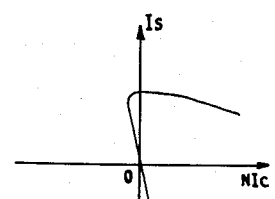

The introduction of a retroactive current into the windings 2, 2', obtained by connecting A to C and B to D and by connecting the terminals E, F, G and H in such manner that when the ampere-turns supplied by the windings 2 and 3 are of like direction, those supplied by the windings 2' and 3' are also of like direction, gives the characteristic curve the form shown in Figure 4, from which it will be seen that two stable values of opposite sign of the output current are produced for a zero control current. These two values may be obtained at will by means of a current impulse of positive or negative sign in the control windings.

Figure 5:
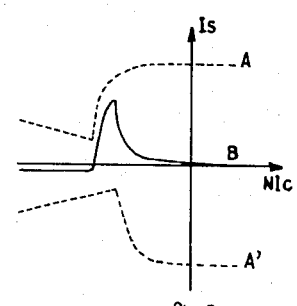

Figure 5 shows the characteristic curve obtained by reversing the terminals of the windings 2' and 3' with respect to their previous direction, and by passing through the windings 4 and 4' polarising currents differing from one another, so that the curves A and A' are not symmetrical to one another with respect to the axis of the abscissae.

If the polarising currents are sufficiently weak and the feedback windings are not introduced between the terminals A and B, the characteristic curve obtained has the form illustrated in Figure 5. The direct output current has a maximum for a particular value of the control current and for slightly higher or lower values of this current, the output current assumes a low positive or negative value, and the resistance 6 or 6' connected in series with either one of the windings 1 or 1' permits of completely cancelling out the positive or negative value of the output current.

Figure 6:
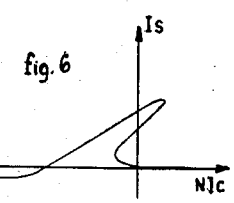

By introducing the feedback windings between the terminals A and B, the characteristic feature assumes the form illustrated in Figure 6. When no current flows through the control windings, the output current may assume two stable values, one zero and the other positive, the intermediate positive value being unstable. When the system is in equilibrium for the zero value of the output current, an impulse of negative direction will cause the output current to change to its positive value. It is to be noted that this positive value is attained only when the impulse ceases, which is a great advantage for certain applications, such as long-impulse counters.

Figure 7:
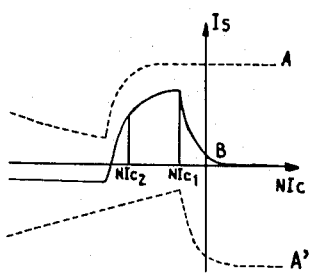

If the feedback windings are not introduced between the terminals A and B and the polarising currents are larger, the characteristic curve has the form shown in Figure 7. When the control current remains between two definite values $Ic_1$ and $Ic_2$, the output current assumes a positive value between two positive values differing slightly from one another. When the value of the control current deviates sufficiently from the values $Ic_1$ and $Ic_2$, the output current retains a low positive or negative value in relation to the previous value.

What is claimed is:

1. Electromagnetic device comprising two magnetic circuits having a rectangular hysteresis loop, each of which circuits supports one control winding and one shock winding which latter is fed by an alternating-current source and is connected in series with a rectifier, the two circuits comprising the series connected shock windings and rectifiers being in parallel with the two rectifiers in opposition, a load circuit connected in common to each of the two shock winding circuits, the device including means adapted to produce dissymmetry between the two magnetic circuits in such manner as to produce an unbalance between the two rectified currents and an output current in said load circuit resulting from the combination of the direct components of the said rectified currents, while the alternating components are eliminated by filtering.

2. Device according to claim 1, wherein the dissymmetry between the two rectified currents is obtained by reversing the control windings.

3. Device according to claim 1, wherein the dissymmetry between the two rectified currents is obtained with the aid of a polarising winding disposed on each of the magnetic circuits, currents of different values being passed through the polarising windings.

4. Device according to claim 1, wherein the dissymmetry between the two rectified currents is obtained with the aid of a resistance connected in series with one or other of the rectifiers.

5. Device according to claim 1, wherein a filter is provided at the output of the shock windings of each parallel-connected magnetic circuit.

6. Device according to claim 5, wherein a feedback winding is disposed on each magnetic circuit, the two feedback windings being connected, in series with one another, to the output of the filter and the direct output current being passed therethrough, so as to enable the output current to assume two stable values for a zero control current.

References Cited in the file of this patent
UNITED STATES PATENTS 2,723,372   Eagan et al. _____ Nov. 8, 1955

FOREIGN PATENTS 129,767   Sweden _____ Oct. 17, 1950
693,663   Great Britain _____ July 1, 1953